United States Patent [19]

Mazdiyasni et al.

[11] 3,923,675

[45] Dec. 2, 1975

[54] METHOD FOR PREPARING LEAD LANTHANUM ZIRCONATE-TITANATE POWDERS

[75] Inventors: Khodabakhsh S. Mazdiyasni, Xenia; Leanne M. Brown, Brookville, both of Ohio

[73] Assignee: The United States of America as represented by the Secretary of the Air Force, Washington, D.C.

[22] Filed: Aug. 9, 1973

[21] Appl. No.: 386,923

[52] U.S. Cl. ............ 252/62.9; 106/73.2; 106/73.3; 423/263; 423/598
[51] Int. Cl.² .................. C04B 35/46; C04B 35/48; C04B 35/50
[58] Field of Search ........... 423/598, 263; 252/62.9; 106/73.2, 73.3

[56] References Cited
UNITED STATES PATENTS

| 3,330,697 | 7/1967 | Pechini | 252/62.9 X |
| 3,472,776 | 10/1969 | Derbyshire | 252/62.9 |
| 3,647,364 | 3/1972 | Mazdiyasni | 423/598 |
| 3,684,714 | 8/1972 | Carl et al. | 252/62.9 |
| 3,699,044 | 10/1972 | Dosch et al. | 252/62.9 |

FOREIGN PATENTS OR APPLICATIONS

| 1,122,380 | 8/1968 | United Kingdom | 423/598 |

*Primary Examiner*—Jack Cooper
*Attorney, Agent, or Firm*—Joseph E. Rusz; Cedric H. Kuhn

[57] ABSTRACT

High purity, submicron-size lead lanthanum zirconate-titanate powders are prepared by the simultaneous hydrolytic decomposition of lead isoamyloxide, lanthanum isopropoxide, and zirconium and titanium tertiary amyloxides. The powders are a source of raw material for consolidation into theoretically dense ferroelectric, antiferroelectric and/or electrooptic bodies with superior electrical and optical properties.

9 Claims, No Drawings

METHOD FOR PREPARING LEAD LANTHANUM ZIRCONATE-TITANATE POWDERS

RIGHTS OF THE GOVERNMENT

The invention described herein may be manufactured and used by or for the Government of the United States for all governmental purposes without the payment of any royalty.

FIELD OF THE INVENTION

This invention relates to a method for preparing high purity, submicron-size lead lanthanum zirconate-titanate (PLZT) powders. In one aspect it relates to calcined PLZT powders that are particularly suitable for use in fabricating ferroelectric, antiferroelectric and/or electrooptic bodies.

BACKGROUND OF THE INVENTION

The development of polycrystalline quaternary, electronic ceramic bodies which will transmit incident light was not possible until methods of controlling stoichiometry, impurity content, porosity and grain size were sufficiently advanced to produce a body with a microstructure having optimized minimal light-scattering and absorption parameters. The first such fully transparent polycrystalline electrooptic material found in the lanthana-doped lead zirconate-titanate system was reported by Haertling and Land in Journal of the American Ceramic Society, 54, 1–11 and 303–309 (1971). In Ferroelectrics, 3, 269–280 (1972), Haertling and Land disclose PLZT ceramics having improved optical and electrooptic properties resulting from the use of PLZT powder in producing the ceramic bodies. In the process used in preparing the powder, lead oxide, zirconium and titanium butoxides, and isopropyl alcohol are added to a mixer and blended for about one minute. While continuing to blend the aforementioned materials, a lanthanum acetate solution is added and the blending is continued for 15 minutes. At the end of this period, the blended slurry is poured into a tray and dried in an oven at 100°C for approximately four hours. After removal of the dried product from the tray, it is crushed, placed in an alumina crucible and calcined at 500°C for sixteen hours. After the calcination, the resulting powder is milled for four hours in acetone and then subjected to a second calcination at 500°C for four hours. From this description of the process, it is seen that many steps are involved in preparing the PLZT powder, a factor which renders the process time consuming and increases the likelihood of introducing impurities.

It is an object of this invention to provide an improved method for preparing PLZT powders.

Another object of the invention is to provide a method for preparing high purity, submicron-size PLZT powders which are homogeneous and possess a desired stoichiometry.

A further object of the invention is to prepare alkoxy-derived PLZT powders which can be consolidated to high density piezoelectric and electrooptic ceramic bodies.

Other objects and advantages of the invention will become apparent to those skilled in the art upon consideration of the accompanying disclosure.

SUMMARY OF THE INVENTION

Broadly speaking, the present invention resides in a method of preparing PLZT powder by hydrolytically decomposing a mixture of lead isoamyloxide, a lanthanum alkoxide, a zirconium alkoxide, and a titanium alkoxide in solution in isoamyl alcohol, and, after washing the hydroxide so obtained, heating same under a vacuum to provide high purity, submicron-size PLZT powder.

In a more specific embodiment, the method of this invention comprises the step of adding to water a solution of lead isoamyloxide and alkoxides in isoamyl alcohol, the alkoxides having the formulas $La(OR)_3$, $Zr(OR)_4$ and $Ti(OR)_4$, where R is individually selected from a group of alkyl radicals containing 3 to 6, inclusive, carbon atoms. The amount of alkoxides in the solution is that required to obtain a product having a desired stoichiometry. The solution is refluxed, e.g., at a temperature ranging from about 70° to 75°C, for a period of time sufficient to form a hydroxide of Pb, La, Zr and Ti. Generally, a period of about 2 to 5 hours is adequate to achieve the desired decomposition. During the refluxing period, additional lead isoamyloxide is added to the solution. The hydroxide is recovered by any suitable means, e.g., by filtration, and washed successively with water and an alcohol. The hydroxide is then dried under a vacuum, thereby obtaining a completely white, amorphous lead lanthanum zirconate-titanate powder. The powder is of a high purity, e.g., greater than 99.95 percent, and has a particle size of 75 to 300A.

The following formula defines the composition of the PLZT powder:

$$Pb_{1-x}La_x(Zr_yTi_z)_{1-x/4}O_3. \qquad (I)$$

For a PLZT powder to be particularly suitable for fabricating electrooptic ceramics, the ratio of La:Zr:Ti is 10:65:35. At this ratio the above formula becomes:

$$Pb_{0.9}La_{0.1}(Zr_{0.63375}Ti_{0.34125})O_3. \qquad (II)$$

The following equations represent the reactions that occur in preparing a PLZT powder having the composition of Formula II;

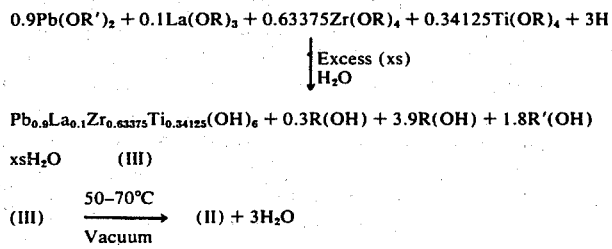

In the foregoing equations, R′ is isoamyl while the alkyl radicals represented by R can be the same or different.

The PLZT powder having the composition represented by Formula II is preferred for preparing electrooptic ceramics. However, ceramics having electrooptic properties can be prepared in which the ratio of La:Zr:Ti is (6–10):65:35. Thus, referring to Formula II, x can equal 0.06 to 0.10 while y and z equal 0.65 and 0.35, respectively. Although the present method is particularly concerned with the preparation of PLZT powders suitable for use in fabricating electrooptic ceramics, the method is applicable to preparing PLZT powders having any desired composition. For example, the ratio of La:Zr:Ti can be (2–20):(10–90):(10–90), where the sum of the ratio of Zr:Ti equals 100. The amounts of the alkoxides required to produce a PLZT powder of desired stoichiometry can be readily calculated from Formula I. At the aforementioned (2–20):(10–90):(10–90) ratio of La:Zr:Ti, the mole ratio of $Pb(OR')_2:La(OR)_3:Zr(OR)_4:Ti(OR)_4$ falls in the following ranges: (0.8 to 0.98):(0.02 to 0.2): (0.095 to 0.8964):(0.095 to 0.8964). The specific amount of each compound used depends, of course, upon the particular composition desired.

The product prepared as described above is a white, amorphous powder. To convert the powder to a crystalline form suitable for fabricating ceramic bodies, the powder is calcined at a temperature ranging from about 300° to 500°C, preferably 400° to 500°C, for a period of about 15 minutes to 1 hour. The calcination is generally conducted in the preferred temperature range in order to maintain the surface activity of the powder. Thereafter, the alkoxy-derived PLZT powder, which is now a solid solution, is ground, e.g., in a $B_4C$ mortar, to effect comminution of larger agglomerates. Only a minimum of grinding is required, an important factor since grinding destroys crystallite morphology.

The calcined PLZT powder is now in a condition suitable for fabricating ceramic bodies. Such bodies can be prepared by the hot pressing method disclosed by Haertling and Land in the above-cited Ferroelectrics publication. However, it has been found that the PLZT powders obtained by the method of this invention can be used in preparing ceramic bodies by a cold pressing method as disclosed in copending U.S. application Ser. No. 386,925, filed Aug. 9, 1973. When preparing ceramic bodies by either of these methods, volatization of PbO occurs at firing temperatures. Thus, as mentioned hereinabove, excess PbO is added in the form of lead isoamyloxide during refluxing of the alkoxides. The amount added is usually in the range of about 2 to 10 weight percent of the original quantity of lead isoamyloxide contained in the solution of alkoxides.

It is important to utilize isoamyl alcohol as the solvent for the alkoxides. It has been found that other alcohols are unsatisfactory for such use, particularly because of their tendency to prematurely precipitate lead compound. The solvent is used in an amount that is at least sufficient to completely dissolve the alkoxides. The solution is added to high purity water, e.g., triply distilled, deionized water. The amount of water employed is in excess, e.g., 1 to 3 mols, of the amount required for the hydrolytic reaction.

The alkoxides employed in preparing the PLZT powders are well known compounds that can be prepared by methods described in the literature. The synthesis of the zirconium and titanium alkoxides is illustrated by the following equations:

$$M(OR)_4 + R''OH \rightarrow M(OR'')_4 + 4ROH.$$

In the above equations, M is zirconium or titanium and R and R'' are alkyl radicals containing 3 to 6, inclusive, carbon atoms. The following equation shows the method used in preparing lead isomyloxide:

$$Pb(C_2H_3O_2)_2 + 2Na(OR') \rightarrow Pb(OR')_2 + NaC_2H_3O_2\downarrow.$$

where R' is an isoamyl group. The method used in preparing lanthanum alkoxides is shown by the following equation:

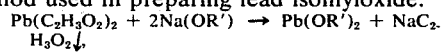

where R is as indicated above.

A more complete understanding of the invention can be obtained by referring to the following illustrative example which is not intended, however, to be unduly limitative of the invention.

EXAMPLE

A run was conducted in which PLZT powder with a nominal zirconate to titanate molar ratio of 65/35 and containing 10 atomic percent lanthanum was prepared in accordance with the method of this invention. Initially, a solution of alkoxides was prepared by adding lead isoamyloxide (0.9 mol), lanthanum trisisopropoxide (0.1 mol), zirconium tertiary amyloxide (0.63375 mol) and titanium tertiary amyloxide (0.34125 mol) to isoamyl alcohol. The solution of metal alkoxides was slowly added to triply distilled, deionized water (about 5 mols). The solution was refluxed for a period of 3 hours, thereby hydrolytically decomposing the alkoxides and forming a mixed metal hydroxide. During the reflux period, 10 weight percent of the 0.9 mol of lead isoamyloxide was added to compensate for volatization of lead oxide that occurs when the PLZT powder is used in fabricating ceramic bodies.

After recovery of the hydroxide by filtration, it was washed several times, first with high purity water and then with isopropanol. The washed hydroxide was dried under a vacuum at 60°C, yielding a completely white amorphous PLZT powder.

Samples of the PLZT powder were calcined at 500°C for 30 minutes and for 1 hour. The calcined samples were then ground in a $B_4C$ mortar to effect comminution of the larger agglomerates. As a result of the calcination, the powder was changed from an amorphous to a crystalline state, thereby rendering the powder suitable for use in preparing electrooptic ceramic bodies. Calcination at higher temperatures and for longer times at 500°C resulted in massive agglomeration or sintering of the particles.

The particle morphology of the powder calcined at 500°C. for 15 minutes and 1 hour was observed by electron microscopy. The electron micrographs as well as electron diffraction obtained indicated crystallites of cubic morphology and crystalline cubic symmetry, respectively.

In the table below, there is shown the results of the emission spectrographic impurity analysis for the PLZT powder (unwashed and washed with water) after calcination at 500°C for 1 hour. The data demonstrate the great increase in purity that results from washing the powder with water. For example, the sodium content was reduced more than four times. Although glass containers were used throughout the preparation, the silicon concentration as well as the calcium concentration were substantially reduced.

TABLE

| Element | PLZT (ppm)[1] (unwashed) | | PLZT (ppm)[1] (water washed) | |
|---|---|---|---|---|
| Na | | 2000 | | 500 |
| Ca | | 100 | | 30 |
| Si | | 200 | | 20 |
| Mn | | 50 | | 30 |
| Al | nd < | 30 | nd < | 30 |
| Mg | nd < | 30 | nd < | 30 |
| B. | nd < | 30 | nd < | 10 |
| Mo | nd < | 10 | nd < | 10 |
| Cu | nd < | 10 | nd < | 10 |
| Cr | nd < | 30 | nd < | 30 |
| Fi | nd < | 100 | nd < | 100 |
| Ni | nd < | 30 | nd < | 30 |
| Sn | nd < | 30 | nd < | 30 |
| Nb | nd < | 100 | nd < | 30 |
| Cb | nd < | 100 | nd < | 100 |
| Ag | nd < | 10 | nd < | 10 |

[1]nd < - not detected, less than

Analysis for C, H, and anions was negative. Wet chemical analysis with an accuracy of ± 0.1% for Pb, Zr, Ti and La was in good agreement with the nominal composition of 10/65/35. This analysis was performed on powder that had been sintered. Analysis for Pb at lower temperatures naturally reflected the excess introduced during the powder preparation.

The X-ray diffraction patterns of the alkoxy-derived PLZT powder was observed on heating from room temperature to 1,090°C using a Pt40Rh substrate and CuKα radiation. Temperatures were measured with a Pt-Pt10Rh thermocouple. The patterns showed that from room temperature to 500°C a very broad peak characteristic of an amorphous phase persisted. However, from 600° to 750°C an orderly transition from the amorphous phase to the crystalline cubic phase ($a_o$ = 4.076A) of PLZT occurred. Because of the excess PbO introduced during the powder preparation, additional peaks of PbO appeared up to 650°C. With continued heating to 750°C, the PbO diffraction peaks decreased in number and intensity while the PLZT peaks increased. Above 800°C diffraction peaks corresponding to segregated PbO appeared. These peaks result from outward diffusion of PbO from the PLZT system at these temperatures. Considerable activity was observed at about 1,000°C so that no pattern could be recorded. When the substrate approached this temperature, the heating rate could not be controlled, and the temperature rapidly reached 1090°C. The results indicate that the alkoxy-derived PLZT powder undergoes slow spontaneous decomposition, leading to the loss of PbO from the system at low temperatures.

The method of this invention involving the intimate mixing of alkoxides during hydrolytic decomposition thereof produces a homogeneous PLZT powder with very high surface activity. After calcination at about 500°C for short periods of time, the powder exhibits crystalline cubic morphology while retaining a high degree of surface activity. The method employed in preparing the PLZT powder involves a simplified procedure as compared to that followed in producing PLZT powder by prior art methods.

As will be evident to those skilled in the art, modification of the invention can be made in view of the foregoing disclosure without departing from the spirit and scope of the invention.

We claim:

1. A method for preparing lead lanthanum zirconate titanate (PLZT) powder which comprises adding to water a mixture consisting essentially of lead isoamyloxide, a lanthanum alkoxide, a zirconium alkoxide and a titanium alkoxide in solution in isoamyl alcohol, the alkoxides corresponding to the formulae $La(OR)_3$, $Zr(OR)_4$ and $Ti(OR)_4$, wherein R is an alkyl radical containing 3 to 6, inclusive, carbon atoms; refluxing the solution at a temperature in the range of about 70° to 75°C for a period of about 2 to 5 hours to hydrolytically decompose said isoamyloxide and alkoxides into a hydroxide of lead, lanthanum, zirconium and titanium; washing the resulting hydroxide; and drying the hydroxide by heating same under a vacuum, thereby obtaining a high purity, amorphous PLZT powder.

2. The method according to claim 1 in which the amounts of lead isoamyloxide and lanthanum, zirconium and titanium alkoxides in the mixture are such as to obtain a product having a desired stoichiometry.

3. The method according to claim 2 in which the hydroxide is washed successively with high purity water and an alochol.

4. The method according to claim 3 in which the mol ratio of lead isoamyloxide:lanthanum alkoxide:zirconium alkoxide:titanium alkoxide in the mixture falls in the following ranges: (0.80–0.98):(0.020 to 0.2):(0.095 to 0.8964):(0.095 to 0.8964).

5. The method according to claim 4 in which 2 to 10 weight percent of the amount of lead isoamyloxide in the mixture is added to the solution during the period of reflux.

6. The method according to claim 5 in which the amorphous powder is calcined by heating same at a temperature ranging from 300 to 500°C for a period of about 15 minutes to 1 hour, thereby converting the powder to a crystalline form.

7. The method according to claim 4 in which the mol ratio of lead isoamyloxide:lanthanum alkoxide:zirconium alkoxide:titanium alkoxide is 0.9:0.1:0.63375:0.34125.

8. The method according to claim 7 in which the lanthanum alkoxide is lanthanum isopropoxide, the zirconium alkoxide is zirzonium tertiary amyloxide and the titanium alkoxide is titanium tertiary amyloxide.

9. The method according to claim 8 in which the amorphous powder is calcined by heating same at a temperature ranging from 300° to 500°C for a period of about 15 minutes to 1 hour, thereby converting the powder to a crystalline form.

* * * * *